United States Patent
Tremblay

(10) Patent No.: US 7,140,211 B2
(45) Date of Patent: Nov. 28, 2006

(54) TAMPER DETECTION SECURITY FOR A TANK TRAILER

(75) Inventor: Daniel Tremblay, St-Jean-sur-Richelieu (CA)

(73) Assignee: Tremcar Inc., Quebec (CA)

( * ) Notice: Subject to any disclaimer, the term of this patent is extended or adjusted under 35 U.S.C. 154(b) by 71 days.

(21) Appl. No.: 10/846,972

(22) Filed: May 13, 2004

(65) Prior Publication Data

US 2005/0092043 A1    May 5, 2005

Related U.S. Application Data

(60) Provisional application No. 60/515,119, filed on Oct. 29, 2003.

(51) Int. Cl.
*B65D 55/14* (2006.01)

(52) U.S. Cl. ............... 70/164; 70/158; 70/256; 70/169; 49/373; 49/799; 49/394; 49/252; 220/303; 220/203; 137/158; 137/385; 137/383; 137/358; 292/307 R; 292/284; 292/DIG. 11; 292/225; 292/235; 292/245; 292/256.6; 292/95; 292/198

(58) Field of Classification Search .......... 70/158–169, 70/839, 256; 280/839, 830; 220/315, 256, 220/303, 203; 137/158, 358, 383, 385; 292/95, 292/198, 245, 256.6, 225, 235, DIG. 11, 292/307 R, 284; 49/373, 799, 394, 252
See application file for complete search history.

(56) References Cited

U.S. PATENT DOCUMENTS

| | | | | |
|---|---|---|---|---|
| 2,194,763 A | * | 3/1940 | Mayer | 298/7 |
| 2,339,006 A | * | 1/1944 | Folmsbee | 220/263 |
| 4,208,839 A | * | 6/1980 | Candy, Sr. | 49/344 |
| 4,598,496 A | * | 7/1986 | Van Daele | 49/357 |
| 4,622,902 A | * | 11/1986 | Miller | 105/377.11 |
| 4,625,888 A | * | 12/1986 | Thompson | 220/262 |
| 4,744,183 A | * | 5/1988 | Kruger | 52/192 |
| 4,854,076 A | * | 8/1989 | Sieben et al. | 49/280 |
| 5,218,784 A | * | 6/1993 | Pollock | 49/279 |
| 5,586,678 A | * | 12/1996 | Rosch et al. | 220/263 |
| 5,715,965 A | * | 2/1998 | Goulding | 220/321 |
| 5,839,597 A | * | 11/1998 | Marttila | 220/264 |
| 6,039,362 A | * | 3/2000 | Nadherny | 292/197 |

* cited by examiner

*Primary Examiner*—Brian E. Glessner
*Assistant Examiner*—William Schrode
(74) *Attorney, Agent, or Firm*—Darby & Darby

(57) ABSTRACT

This invention relates to a security system aimed at closing and locking a cover of an opening of a tank trailer to avoid any tampering of its content and to prove that the content of the tank has not been tampered. The security system comprises a locking member movable between a lock position to prevent the opening of the cover, and an unlock position to allow the opening of the cover. The invention also comprises an actuating device mounted to the tank trailer operatively connected to the locking member for moving it between the lock and the unlock positions. A sealing mechanism engages the actuating device when the locking member is in the lock position to prevent any movement of the locking member. The sealing mechanism comprises a breakable indicator which is broken upon disengagement from the actuating device, thereby indicating that the openable cover has been tampered with.

14 Claims, 5 Drawing Sheets

TAMPER DETECTION SECURITY FOR A TANK TRAILER

FIELD OF THE INVENTION

This invention relates generally to the field of tank trailer and more particularly, but not exclusively, to a tank trailer with a security system aimed at closing and locking the tank trailer in order to avoid any tampering of its content and to prove that the content of the tank has not been tampered.

BACKGROUND OF THE INVENTION

Tank trailers are generally used in the transport industry for the transportation of liquid or solid powdered products. They typically include a large stainless steel tank, made out of a single or of plural internal compartments, and an undercarriage such that they may be pulled on the road by a tractor truck. Tank trailers may be used for transportation of liquid products for example in the food industry (such as milk, syrup or liquid sugar), in the chemical industry (peroxide, phenol, dangerous products) or in the petroleum industry (raw oils). They may also be used for transportation of solid powdered products used in different sectors such as cement, salt or plastic pellets.

The typical tank trailer has several openings that may be found in different locations according to its specific use. Usually, the tank trailer will have an opening at one end to allow for the filling of the tank with the transported product, and one or several openings at the bottom to allow the tank to be emptied. Other than these, one will also find at least one vent, provided for air circulation during the filling and the emptying phases, and one or many manholes, the manholes being generally placed on the top of the tank trailer.

In use, the tank trailer is firstly washed and disinfected before it leaves to be filled with the product to be transported. During the washing process, all of the openings are opened, including manholes on the top of the tank trailer to allow personnel into the tank, for example for inspection purposes. The manholes are usually closed by a flap cover hingedly mounted to the manhole ridge. The vent, as well as the filling and the emptying openings, usually provide an external communication with the inside of the tank only when a specially adapted connector is used. Contrary to the manholes, they do not allow enough room for a person to pass through and access the interior of the tank.

Once the tank has been washed, disinfected and inspected, all the openings are tightly closed and the tank trailer is ready to leave for its first destination in order to be filled. At a relevant facility, the tank trailer is filled with the product. The only openings that are opened during this process are the filling opening and a vent, the others remaining closed. Once filled, the tank trailer is then brought to its delivery destination. The tank is then emptied of its content to deliver the product, the only openings being opened then are the emptying openings and the vent, the others remaining closed. The tank trailer is finally returned to its departure point for washing and sanitising in prevision of another run. One will notice that the manholes never need to be opened during the whole process of transportation.

Independently of the specific product transported into such tank trailers, the industry in general, as well as governments, are now more concerned with the potential danger associated with the tampering of the products inside these tank trailers. The poisoning of a batch of milk, either intentional or accidental, is one example among others of the damage that could result from a tampering of a tank trailer.

A common drawback with prior art tank trailers is that these do not allow locking in place the flap covers closing the manholes in order to eliminate any tampering of the product inside the tank trailer during transportation. The flap covers are easily openable from the outside of the tank trailer, simply by unscrewing the latches. Moreover, these do not provide an operator any means to monitor, from the ground, if any tampering of the product has occurred during transportation.

Therefore, there is a need for a tank trailer that would allow for the locking in place of the manholes as well as for the monitoring of any tampering of the products inside during the transportation process.

OBJECTS AND SUMMARY OF THE INVENTION

An object of the present invention is to provide a tank trailer with a security system that can securely lock in place the flap covers used to close holes in a tank trailer, while at the same time provide a seal to the tank to monitor if the content of the tank has been tampered.

Another object of the present invention is to provide a tank trailer with a security system that allows for the monitoring of the continuous sealing of the tank by an operator standing on the ground.

In accordance with these objects, there is therefore provided a security system for detecting if an openable cover covering at least one hole in a wall of a tank trailer has been tampered with.

The security system first includes a locking member mounted to the tank trailer. The locking member is movable between a lock position wherein opening the cover is prevented, and an unlock position wherein opening the cover is allowed. An actuating device is also mounted to the tank trailer and is operatively connected to the locking member, in order to move the locking member between the lock position and the unlock position. Finally, a sealing mechanism engages the actuating device when the locking member is in the lock position, in order to prevent movement thereof. The sealing mechanism includes a breakable indicator on which is broken upon disengaging the sealing mechanism from the actuating device, thereby indicating that the openable cover has been tampered with.

In accordance with another aspect of the present invention, there is also provided a tank trailer which includes a tank having at least one hole in a wall thereof, an openable cover covering this hole and a security system as above to detect if the openable cover has been tampered with.

Advantageously, as opposed to conventional tank trailers, the present invention allows the operator to lock in place the flap covers closing the manholes and to monitor and ensure that the manholes have not been opened between two points of control.

Other features and advantages of the present invention will be better understood upon reading of preferred embodiments thereof, with reference to the appended drawings.

DESCRIPTION OF PREFERRED EMBODIMENTS OF THE INVENTION

Figure 1:
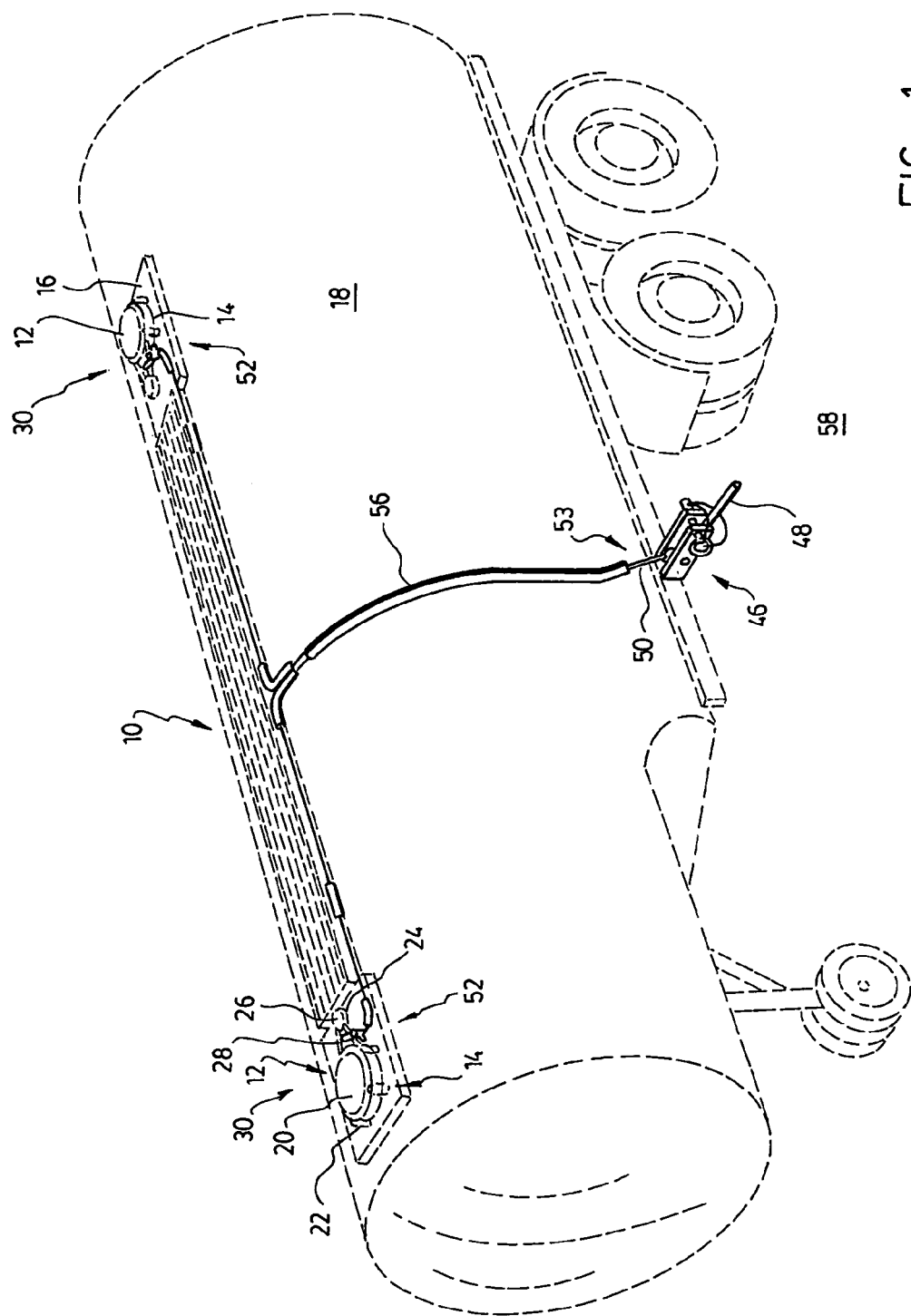
FIG. 1 is a perspective view of a tank trailer provided with a security system according to a preferred embodiment of the invention.

Referring to FIG. 1, and in accordance with a first preferred embodiment of the present invention, there is provided a security system 10 for detecting if an openable cover 12 covering at least one hole 14 in a wall 16 of a tank trailer 18 has been tampered with, and a tank trailer 18 provided with such a system.

As explained above, tank trailers 18 typically have several types of opening, such as filling holes, emptying holes, vents, and generally one or many manholes from which personnel is allowed inside the tank. Although the preferred embodiment of the invention is described below as applied to a manhole 14, which is usually the most convenient way from which the inside of the tank may be accessed, it is understood that the present invention may equally be applied to any other opening of a tank trailer that could be tampered with at any step of the transportation process. It is further understood that one or more openings of a given tank trailer could be protected by a security system according to the present invention; in the illustrated embodiment of FIG. 1, two such manholes 14 are protected.

Each manhole 14 is covered by an openable cover 12. Preferably, the cover is a disk 20 hingedly connected to the wall 16 of the tank trailer 18 next to the manhole 14. Preferably, the disk 20 is affixed to the tank wall through a plurality of screws 22 equally distributed around the disk 20. In an the illustrated embodiment, a vent opening 24 is located proximate to the manhole 14 and covered by a second disk 26, and the two disks 20 and 26 are connected by a rigid linking element 28, which preferably include two arms extending on either sides of the disks 20 and 24. The two disks 20 and 26 and the rigid linking element 28 define together the openable cover 12.

Figure 2:
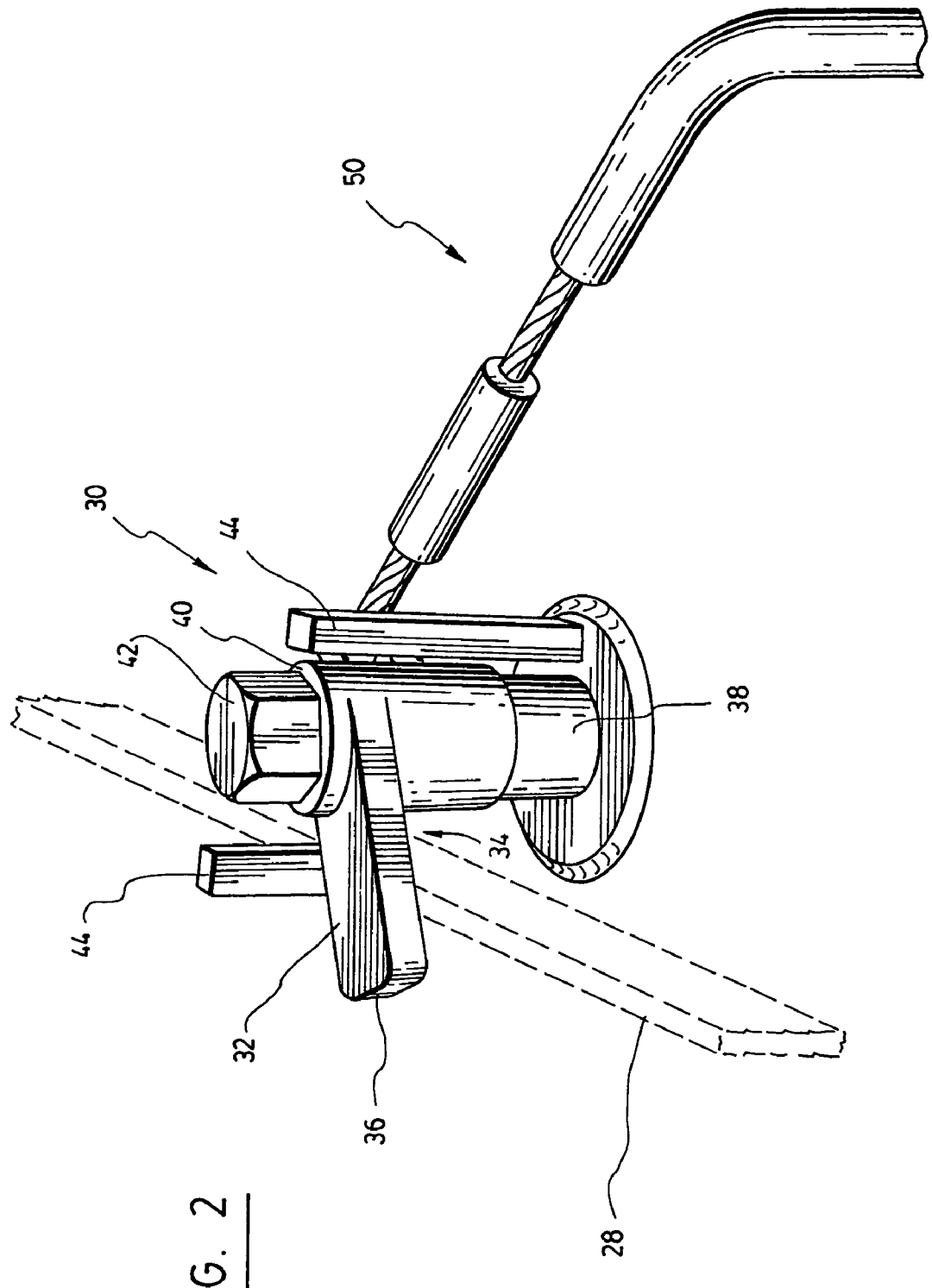
FIG. 2 is a perspective view of a locking member of a security system according to the preferred embodiment.
Figure 3A:
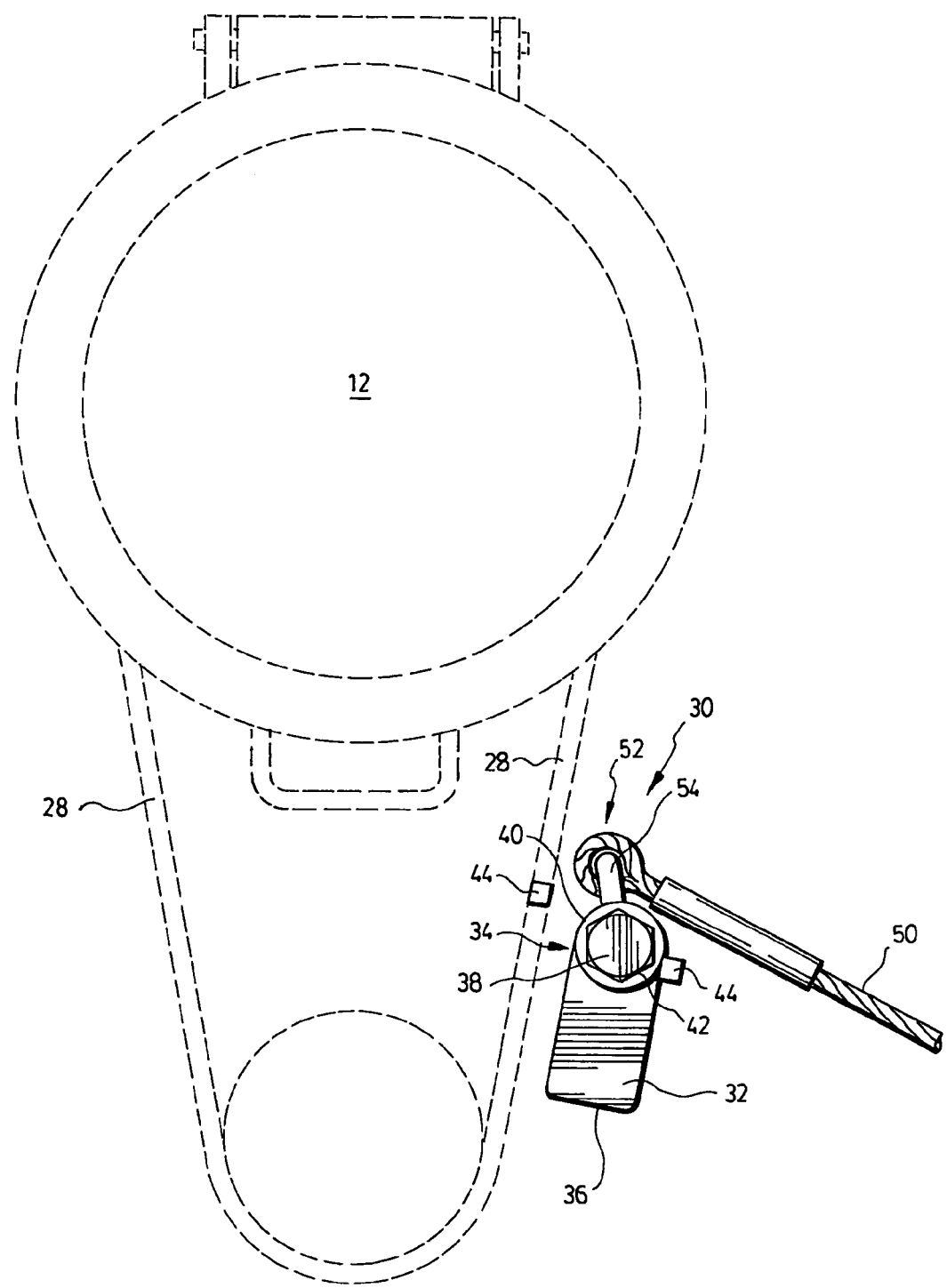
FIGS. 3A and 3B are top views of an openable cover and the locking member of FIG. 2, respectively in the unlock and lock positions.
Figure 3B:
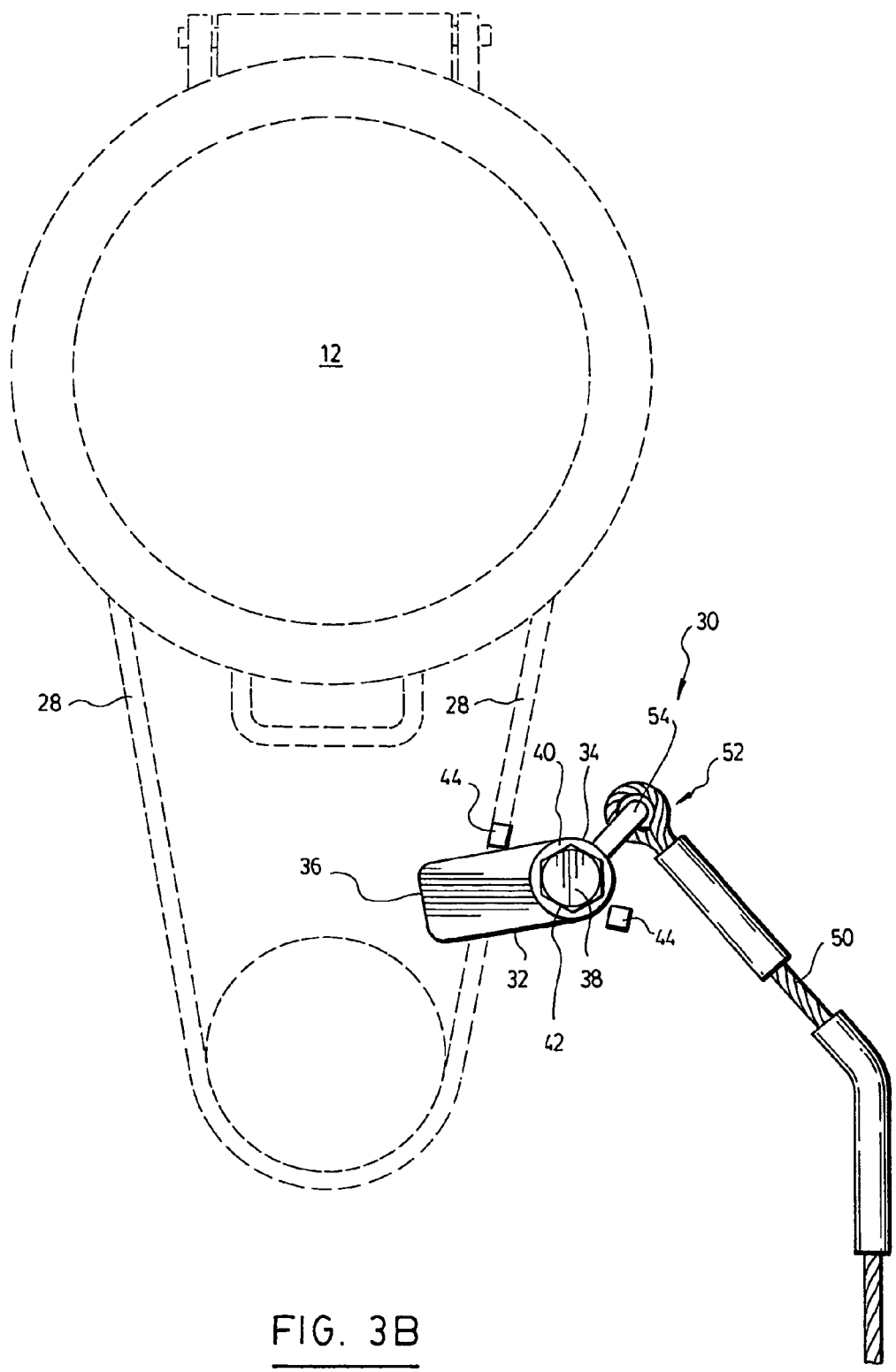

Referring to FIGS. 2, 3A and 3B, the security system first includes a locking member 30 mounted to the tank trailer. The locking member 30 is movable between two positions: a lock position (FIGS. 2 and 3B) where opening the cover 12 is prevented, and an unlock position (FIG. 3A) where opening the cover 12 is allowed. In the preferred embodiment, the locking member 30 includes a cantilever arm 32. The cantilever arm 32 has an anchor end 34 mounted to the tank trailer adjacent to the cover 12, and a rotatable end 36 rotatable around the anchor end 34. Preferably, the cantilever arm 32 is mounted on a tubular sleeve 40 rotatably mounted around a shaft 38 projecting transversally from the tank trailer. A locking bolt 42 is affixed to the shaft 38 to prevent removal of the tubular sleeve 40 therefrom. The cantilever arm 32 projects radially from the sleeve 40, so that it extends generally in parallel to the tank wall (which is in the plane of the page on FIGS. 3A and 3B), at a distance from it sufficient so that it may lie just over a portion of the cover 12 to prevent it from being lifted. In this manner, the cantilever arm 32 may be rotated around the shaft 38 defining a rotational path between the lock position (FIGS. 2 and 3B), where it extends over the cover 12, and the unlock position (FIG. 3A) where it extends away from the cover 12. To prevent the cantilever arm 32 from going all the way around the shaft 38, a pair of stops 44 are preferably provided, strategically located in the rotational path to block the rotation of the cantilever arm 32 beyond the lock and unlock positions, respectively. In the illustrated embodiment, one of those stops is provided on the linking element 28.

Referring back to FIG. 1, the security system further includes an actuating device 46 mounted to the tank trailer 18, and operatively connected to the locking member 30 in order to move it between the lock position and the unlock position. Preferably, the actuating device includes a lever 48 pivotally attached to the tank trailer, and a metal wire 50 having a first end 52 connected to the locking member 30 and a second end 53 operatively connected to the lever. In this manner, pivoting the lever will pull on the metal wire to move the locking member from the unlock to the lock position. In the illustrated embodiment, the metal wire separates into two second ends 52 so that the lever 48 will activate two separate locking members 30 protecting two covers 12. Preferably, the first end 52 of the metal wire 50 is securely attached to a hook 54 projecting from the tubular sleeve 40 opposite to the cantilever arm 32 (see FIGS. 3A and 3B). A rigid sleeve 56 may be provided intimately following the exterior surface of the tank trailer 18, the metal wire 50 being slideably mounted therein. Advantageously, the lever 48 is attached to the tank trailer 18 at a position reachable by an operator standing on the ground 58 besides the tank trailer 18. In this manner, the security system 10 is easy to operate and its integrity can be easily verified at any time through simple visual inspection from the ground 58.

Figure 4A:
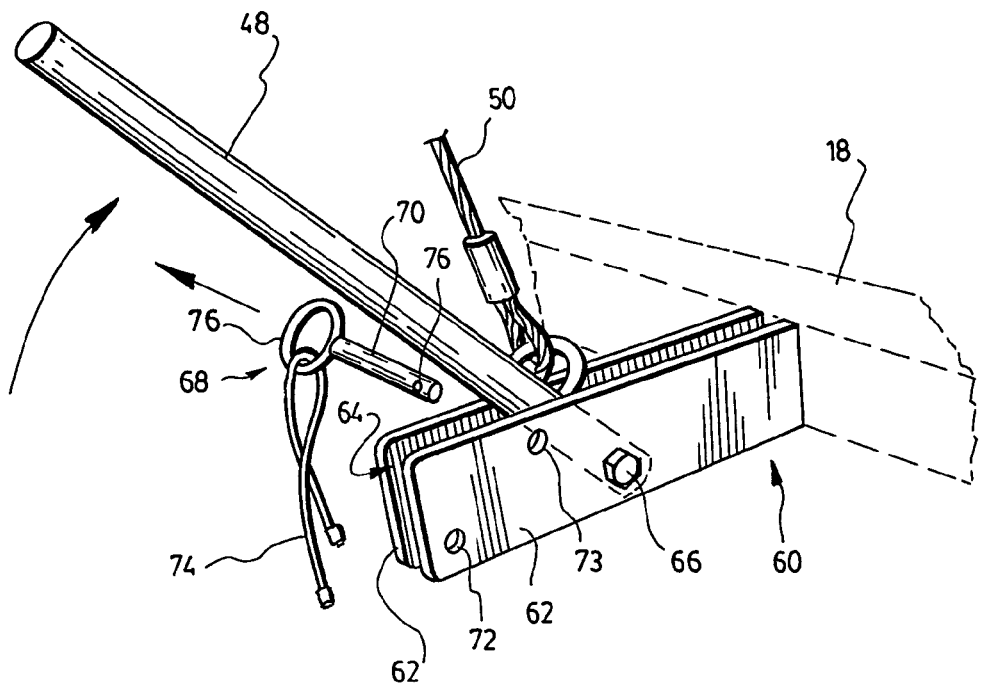
FIGS. 4A and 4B are partially cross-sectional perspective views of an actuating device for a security system for cooperating with the locking member of FIG. 2 when it is respectively in the unlock and lock positions.
Figure 4B:
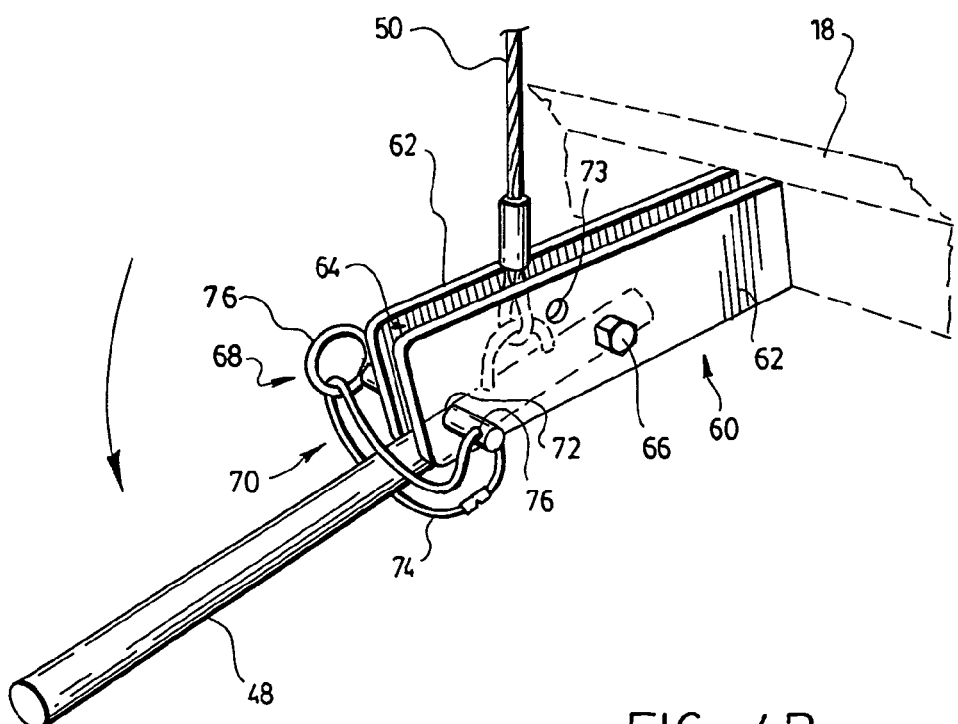

Referring to FIGS. 4A and 4B, the lever 48 is preferably mounted to the tank trailer through a mounting structure 60 which includes a pair of mounting walls 62 projecting from the tank trailer 18 and defining a vertical channel 64 therebetween for receiving the lever 48. In the preferred embodiment, the mounting walls 62 are defined by two L-shaped brackets attached to the tank trailer 18 in alignment together. A pivot shaft 66 is mounted transversally between the mounting walls 62, and the lever 48 is mounted thereto. The pivot shaft 66 therefore defines the pivoting axis of the lever 48. The extremity of the lever 48 may be rigidly mounted to the pivot shaft 66, which itself pivots along its longitudinal axis. Alternatively, the pivot shaft 66 may be rigidly mounted to the mounting structure 60 and the lever 48 itself attached pivotally around the pivot shaft 66.

In the illustrated embodiment, the lever 48 is made to pivot in a plane perpendicular to the wall of the tank trailer 18. It is however understood that it may alternatively pivot in a plane parallel to the tank, as long as its pivoting movement efficiently pulls on the metal wire 50 to move the locking member between the lock and unlock position. In another alternative, the actuating device may not include a lever at all, but be embodied by any type of mechanical switch whose movement cooperates adequately with the locking member.

The security system also includes a sealing mechanism 68 engaging the actuating device when the locking member is in the lock position (FIG. 4B), in order to prevent its movement. The sealing mechanism includes a breakable indicator which is broken upon disengaging the sealing mechanism from the actuating device (FIG. 4A), the breakable indicator thereby indicating that the openable cover may have been tampered with.

In the preferred embodiment, a rigid pin 70 is provided receivable in a pair of aligned holes 72 in the mounting walls. These aligned holes 72 are provided at a location selected so that when mounted, the rigid pin 70 prevents the lever from pivoting, and thereby move the locking member from the lock to the unlock position. A set of supplementary aligned holes 73 may also be provided to receive the pin and therefore support the lever when the locking member is in the unlock position, for convenience.

In the present embodiment, the breakable indicator includes a cable seal 74 securely attached to opposite extremities 76 of the rigid pin 70 when it is received between the aligned holes 72 (see FIG. 4B). Any known seals of various types, which are apt to be attached to the rigid pin 70, could be used for this purpose. It is only required that the breakable indicator cannot be disengaged from either extremity 76 of the rigid pin 70 without being damaged. For more security, the breakable indicator could be identified by a unique marker such as a bar code or other identifying feature.

The system described above advantageously allows an operator to detect immediately any attempt to tamper with the contents of the tank. Indeed, to open the cover of the manhole, one must necessarily break the breakable indicator of the sealing mechanism to be able to remove the rigid pin, and then pivot the lever to move the locking member in the unlock position. Only then will the manhole be accessible.

Of course, numerous modifications could be made to the embodiment above without departing from the scope of the invention as defined in the appended claims.

The invention claimed is:

1. A security system for detecting if an openable cover covering at least one hole in a wall of a tank trailer has been tampered with, said security system comprising:
   a locking member mountable to the tank trailer and movable between a locked position wherein said locking member blocks said cover from being opened, and an unlocked position wherein said locking member extends unobstructively away from said cover, said locking member comprising:
      a cantilever arm having an anchor end mountable to the tank trailer adjacent to the cover and a rotatable end rotatable around the anchor end, said cantilever arm being rotatable between the locked position where it extends over the cover and the unlocked position where it extends unobstructively away from the cover, said cantilever arm having a rotation path extendable in a plane generally in parallel with the wall of the tank trailer;
      a shaft adapted to project transversally from the tank trailer; and
      a tubular sleeve rotatably mounted around said shaft, the cantilever arm projecting radially from said sleeve;
   an actuating device mountable to the tank trailer and being operatively connected to the locking member in order to move said locking member between the locked position and the unlocked position; and
   a sealing mechanism capable of engaging the actuating device when the locking member is in the locked position in order to prevent movement thereof, said sealing mechanism comprising a breakable indicator which is broken upon disengaging the sealing mechanism from the actuating device, thereby indicating that the openable cover has been tampered with.

2. A security system according to claim 1, wherein the locking member further comprises a locking bolt affixed to said shaft to prevent removal of the tubular sleeve therefrom.

3. A security system according to claim 1, wherein the locking member further comprises a pair of stops located in the rotational path of said cantilever arm and blocking the rotation thereof beyond said locked and unlocked positions, respectively.

4. A security system according to claim 1, wherein the locking member further comprises a hook projecting from the tubular sleeve opposite the cantilever arm, said hook cooperating with the actuating device for moving the locking member between the locked and unlocked positions.

5. A security system for detecting if an openable cover covering at least one hole in a wall of a tank trailer has been tampered with, said security system comprising:
   a locking member mountable to the tank trailer and movable between a locked position wherein said locking member blocks said cover from being opened, and an unlocked position wherein said locking member extends unobstructively away from said cover;
   an actuating device mountable to the tank trailer and being operatively connected to the locking member in order to move said locking member between the locked position and the unlocked position, said actuating device comprising;
      a lever pivotally attachable to the tank trailer; and
      a metal wire having a first end connected to the locking member and a second end operatively connected to the lever;
      whereby pivoting said lever pulls on the metal wire to move the locking member from the unlocked to the locked position; and
   a sealing mechanism capable of engaging the actuating device when the locking member is in the locked position in order to prevent movement thereof, said sealing mechanism comprising a breakable indicator which is broken upon disengaging the sealing mechanism from the actuating device, thereby indicating that the openable cover has been tampered with.

6. A security system according to claim 5, wherein the lever is attachable to the tank trailer at a position reachable by an operator standing on the ground besides said tank trailer.

7. A security system according to claim 5, wherein the actuating device further comprises a rigid sleeve capable of intimately following an exterior surface of the tank trailer, the metal wire being slideably mounted therein.

8. A security system according to claim 5, wherein the actuating device further comprises a mounting structure for mounting the lever to the tank trailer, said mounting structure comprising a pair of mounting walls projecting from the tank trailer and defining a vertical channel therebetween for receiving said lever.

9. A security system according to claim 8, wherein the mounting structure further comprises a pivot shaft mounted transversally between said mounting walls, the lever being mounted thereto.

10. A security system according to claim 8, wherein the sealing mechanism comprises:
   a pair of aligned holes provided in said mounting walls; and
   a rigid pin receivable between said aligned holes to prevent the pivoting of the lever, said rigid pin cooperating with the breakable indicator.

11. A security system according to claim 10, wherein the breakable indicator comprises a cable securely attached to opposite extremities of the rigid pin when said pin is received between said aligned holes.

12. A tank trailer comprising:
   a tank having a manhole and a vent proximate to said manhole in a wall of said tank;

an openable cover comprising a first disk for covering said manhole, a second disk for covering said vent and a linking member linking the two; and a security system for detecting if the openable cover has been tampered with, said security system comprising:

a locking member mounted to the tank trailer and movable between a locked position wherein said locking member blocks said cover from being opened, and an unlocked position wherein said locking member extends unobstructively away from said cover;

an actuating device mountable to the tank trailer and being operatively connected to the locking member in order to move said locking member between the locked position and the unlocked position; and a sealing mechanism capable of engaging the actuating device when the locking member is in the locked position in order to prevent movement thereof, said sealing mechanism comprising a breakable indicator which is broken upon disengaging the sealing mechanism from the actuating device, thereby indicating that the openable cover may have been tampered with.

13. A tank trailer according to claim 12, wherein the locking member comprises a cantilever arm having an anchor end mountable to the tank trailer adjacent to the cover and a rotatable end rotatable about the anchor end between the locked position where it extends over the cover, and the unlocked position where it extends unobstructively away from the cover.

14. A tank trailer according to claim 12, wherein the locking member comprises a cantilever arm having an anchor end mounted to the tank trailer adjacent to the cover and a rotatable end rotatable around the anchor end between the locked position where it extends over the linking member of the cover, and the unlocked position where it extends unobstructively away from the cover.

* * * * *